United States Patent [19]

Terai

[11] Patent Number: 4,949,932
[45] Date of Patent: Aug. 21, 1990

[54] SEAT SLIDE DEVICE

[75] Inventor: Masanori Terai, Ayase, Japan

[73] Assignee: Ikeda Bussan Co., Ltd., Ayase, Japan

[21] Appl. No.: 320,715

[22] Filed: Mar. 8, 1989

[30] Foreign Application Priority Data

Jul. 28, 1988 [JP] Japan .......................... 63-100557[U]

[51] Int. Cl.⁵ .............................................. B60N 1/08
[52] U.S. Cl. ..................................... 240/430; 248/393
[58] Field of Search ............... 248/430, 429, 393, 394;
74/529, 543

[56] References Cited

U.S. PATENT DOCUMENTS 2,723,711 11/1955 Duncan ............................... 248/394
4,568,054 2/1986 Degremont ......................... 248/429

FOREIGN PATENT DOCUMENTS 0141309 5/1985 European Pat. Off. .

Primary Examiner—Alvin C. Chin-Shue

Attorney, Agent, or Firm—Foley & Lardner, Schwartz, Jeffery, Schwaab, Mack, Blumenthal & Evans

[57] ABSTRACT

Herein disclosed is a seat slide device which comprises two slider units which are substantially the same in construction and arranged in parallel with each other, each slider unit including a lower rail adapted to be fixed to a floor member and an upper rail longitudinally slidably disposed on the lower rail and mounting thereon a seat; two lock mechanisms respectively mounted to the two slider units for locking the upper rails relative to the lower rails, each lock mechanism including a plurality of notches formed in the lower rail, a locking lever pivotally supported by the upper rail, and a pawl carried by the locking lever and latchingly engageable with the notches; and a lock releaser incorporated with both of the two lock mechanisms for cancelling the locked condition of the lock mechanisms when manipulated, wherein the lock releaser comprises two parts which are pivotally connected at their first portions to each other and secured at their second portions to the locking levers of the two lock mechanisms respectively.

9 Claims, 2 Drawing Sheets

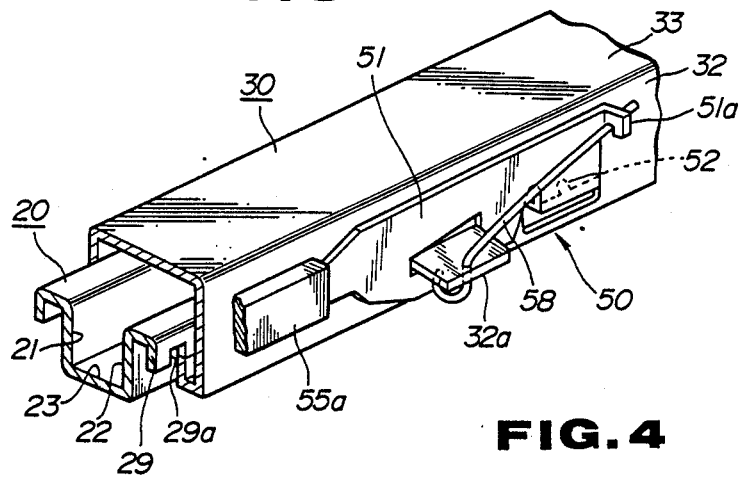
FIG. 3
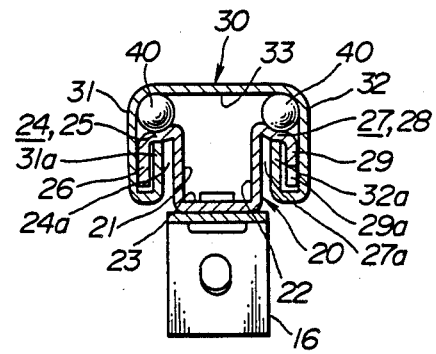
FIG. 4
FIG. 5
(PRIOR ART)
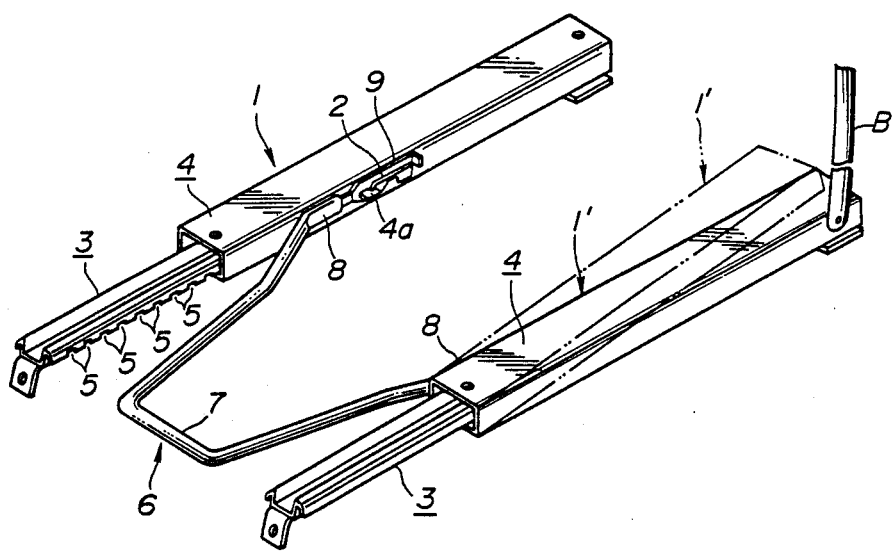

SEAT SLIDE DEVICE

BACKGROUND OF THE INVENTION

1. Field of the Invention

The present invention relates in general to seat slide devices of a motor vehicle, and more particularly to seat slide devices having lock mechanisms incorporated therewith. More specifically, the present invention is concerned with seat slide devices of a type which comprises two parallel slider units each including a lower rail secured to a floor and an upper rail slidably disposed on the lower rail and a seat mounted thereon, two lock mechanisms respectively associated with the two slider units for locking the upper rails at desired fore-and-aft positions relative to the lower rails, and a lock releaser incorporated with both the two lock mechanisms for cancelling the locked condition of the lock mechanisms when manipulated.

2. Description of the Prior Art

In order to clarify the task of the present invention, one conventional seat slide device having a lock releaser 6 will be described with reference to FIG. 5 of the accompanying drawings.

The seat slide device comprises two slider units 1 and 1' (viz., right and left slider units) which are arranged in parallel with each other. Each unit comprises a lower rail 3 connected to a floor (for example, a vehicle floor) and an upper rail 4 slidably disposed on the lower rail 3 and a seat (not shown) mounted thereon.

The lock mechanisms are respectively associated with the two slider units. Each lock mechanism comprises a plurality of notches 5 formed in the lower rail 3, a locking lever 9 pivotally supported by a support lug 4a of the upper rail 4, a pawl (not shown) carried by the locking lever 9 and latchingly engageable with the notches 5, and a biasing spring 2 for biasing the locking lever 9 in a direction to achieve the latching engagement between the pawl and a selected one of the notches 5.

The lock releaser 6 is of a generally U-shaped bar which has leg portions 8 and 8 respectively secured to the pivotally supported locking levers 9 of the two slider units 1 and 1'. Denoted by numeral 7 is a handle portion of the bar 6, which is to be manipulated by an operator (viz., a seat occupant) when position change of the seat position is required by him or her.

Due to the force of the biasing springs 2, the pawl of the locking lever 9 of each slider unit 1 or 1 is kept engaged with one of the notches 5 of the lower rail 3 locking the upper rail 4 at a desired fore-and-aft position relative to the lower rail 3.

When, for the purpose of changing the seat position, the handle portion 7 of the bar 6 is raised by an operator (viz., a seat occupant) against the force generated by the biasing springs 2, the pawl of the locking lever 9 of each lock mechanism is disengaged from the notch 5 cancelling the locked condition of the upper rail 4. Thus, under this condition, the seat is permitted to move forward or rearward to a new desired position.

When the seat is moved to the new position, the handle portion 7 of the bar 6 is released from the operator's hand. With this, the pawl of the locking lever 9 of each lock mechanism is brought into engagement with a newly selected one of the notches 5 by the force of the biasing spring 2. Thus, the seat becomes locked at the new position.

However, the above-mentioned seat slide device has the following drawback particularly when the same is of a type wherein an end of a seat belt B is connected to one of the upper rails 4, for example, the upper rail 4 of the left slider unit 1' as shown in FIG. 5.

That is, when, due to a vehicle collision or the like, the seat belt B is applied with an excessive load by a belt wearer on the seat, the upper rail 4 to which the seat belt B is connected tends to be raised or deformed separating from the lower rail 3 as is shown by a phantom line. The raising of the upper rail 4 may cancel the locked condition of the lock mechanism mounted to the left slider unit 1'. In addition to this undesired phenomenon, the raising of the upper rail 4 causes an upward movement of the handle portion 7 of the bar 6, and thus, similar to the case of the lock releasing operation properly effected by the operator, the locked condition of the other lock mechanism mounted to the right slider unit 1 tends to be cancelled. These phenomena may induce a dangerous slippage of the seat on the lower rails 3 upon such vehicle collision.

SUMMARY OF THE INVENTION

It is therefore an object of the present invention to provide a seat slide device which is free of the above-mentioned drawback.

According to the present invention, there is provided a seat slide device which includes two slider units, two lock mechanisms incorporated with the two slide units respectively, and an improved lock releaser. The lock releaser is so constructed as not to induce cancellation of the locked condition of the lock mechanism on one slider unit even when the upper rail of the other slider unit is raised due to a vehicle collision or the like.

According to the present invention, there is provided a seat slide device which comprises two slider units which are substantially the same in construction and arranged in parallel with each other, each slider unit including a lower rail adapted to be fixed to a floor member and an upper rail longitudinally slidably disposed on the lower rail and a seat mounted thereon; two lock mechanisms respectively mounted to the two slider units for locking the upper rails relative to the lower rails, each lock mechanism including a plurality of notches formed in the lower rail, a locking lever pivotally supported by the upper rail, and a pawl carried by the locking lever and latchingly engageable with the notches; and a lock releaser incorporated with both of the two lock mechanisms for cancelling the locked condition of the lock mechanisms when manipulated, wherein the lock releaser comprises two parts which are pivotally connected at their first portions to each other and secured at their second portions to the locking levers of the two lock mechanisms respectively.

BRIEF DESCRIPTION OF THE DRAWINGS

Other objects and advantages of the present invention will become apparent from the following description when taken in conjunction with the accompanying drawings, in which:

FIG. 3 is a perspective view of a part of one slider unit where a lock mechanism is mounted;

FIG. 4 is an enlarged sectional view taken along the line IV—IV of FIG. 1; and

FIG. 5 is a view similar to FIG. 1, but showing a conventional seat slide device.

DETAILED DESCRIPTION OF THE INVENTION

Figure 1:
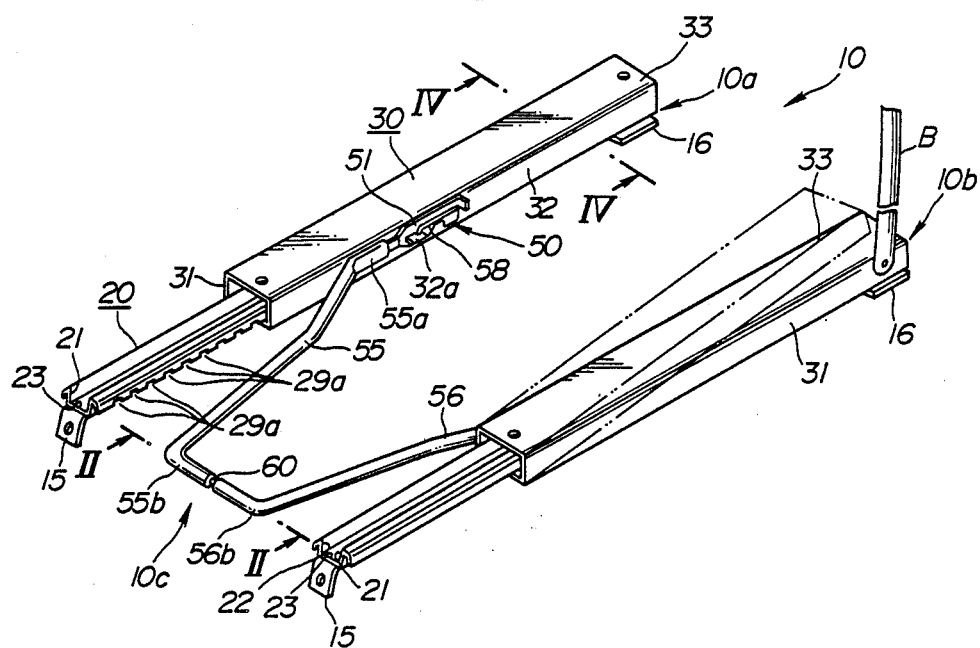
FIG. 1 is a perspective view of a seat slide device of the present invention.

Referring to FIGS. 1 to 4, particularly FIG. 1, there is shown a seat slide device 10 of the present invention, which is equipped with an improved lock releaser 10c.

As is seen from FIG. 1, the seat slide device 10 comprises generally two, viz., right and left, slider units 10a and 10b and lock mechanisms 50 (only one is shown) respectively associated with the two slider units 10a and 10b.

Since the two slider units 10a and 10b are substantially the same in construction except for small things caused by the symmetrical arrangement therebetween, the following description on the slider units 10a and 10b will be made only with respect to the right slider unit 10a which is to be positioned at a right side when mounted on a vehicle floor.

The slider unit 10a comprises a lower rail 20 which is connected to the vehicle floor and an upper rail 30 which is slidably disposed lower rail 20 and a seat (not shown) mounted thereon. As will become apparent as the description proceeds, the upper rail 30 is arranged and constructed to cover the lower rail 20.

As is shown in FIG. 1, the lower rail 20 has at its front and rear ends respective mounting brackets 15 and 16 secured to the vehicle floor.

As is seen from FIG. 4, the lower rail 20 comprises a channel portion 23 having side walls 21 and 22, and outward flanges 24 and 27 extending outward from tops of the respective side walls 21 and 22. Each outward flange 24 or 27 includes an outwardly extending inclined portion 25 or 28 and a downwardly extending vertical portion 26 or 29. Thus, a longitudinally extending slot 24a or 27a is defined between the side wall 21 or 22 and the associated side flange 24 or 27. The outwardly extending inclined portion 25 or 28 is formed at its upper surface with a longitudinally extending shallow guide groove (no numeral) along which after-mentioned ball bearings 40 run.

As is seen from FIGS. 1 and 3, the vertical portion 29 of the side flange 27 is formed with a plurality of notches 29a which constitute part of the lock mechanism 50 which will be described in detail hereinafter.

The upper rail 30 comprises a channel portion 33 having side walls 31 and 32. Each side wall 31 or 32 has an inwardly turned flange 31a or 32a. Each side wall 31 or 32 and the major flat wall portion (no numeral) of the upper rail 30 constitute at their joined curved portion a longitudinally extending guide way along which the ball bearings 40 run as will be described in the following.

As will be understood from FIGS. 1, 3 and 4, the upper rail 30 is slidably mounted on the lower rail 20 having the inwardly turned flanges 31a and 32a slidably disposed in the longitudinally extending slots 24a and 27a of the lower rail 20, and the ball bearings 40 are rotatably disposed between each guide groove of the lower rail 20 and the associated guide way of the upper rail 30, as shown.

Thus, the upper rail 30 can smoothly slide forward or rearward on and along the lower rail 20 due to provision of the ball bearings 40 therebetween.

As is best seen from FIG. 3, the lock mechanism 50 of each slider unit 10a or 10b comprises the notches 29a formed in the lower rail 20, a locking lever 51 pivotally supported by the side wall 32 of the upper rail 30 through a supporting lug 32a, a pawl 52 carried by the locking lever 51 and latchingly engageable with the notches 29a and a bar spring 58 for biasing the locking lever 51 in a direction to achieve the latching engagement between the pawl 52 and the notches 29a. In the illustrated example, the bar spring 58 has one end connected to the supporting lug 32a and the other end hooked to a leading bent end 51a of the locking lever 51.

As is seen from FIG. 1, the lock releaser 10c comprises two generally L-shaped bars 55 and 56 which are identical in construction. The bars 55 and 56 are secured at their leg portions 55a and 56a to base portions of the respective locking levers 51 of the two lock mechanisms, and pivotally connected at their shorter arm portions 55b and 56b to each other.

Figure 2:
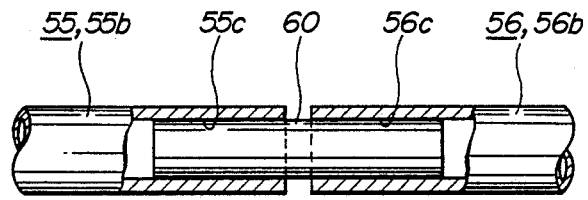
FIG. 2 is an enlarged sectional view taken along the line II—II of FIG. 1.

As is seen from FIG. 2, for the pivotal connection between the shorter arm portions 55b and 56b, a shaft 60 is employed which has axially opposed portions rotatably disposed in respective cylindrical bores 55c and 56c formed in the shorter arm portions 55b and 56b. Thus, it will be appreciated that the two L-shaped bars 55 and 56 are mutually pivotal about the shaft 60. The shorter arm portions 55b and 56b thus connected constitute a handle part of the lock releaser 10c, which is to be manipulated by an operator (viz., a seat occupant) when position change of the seat is required by him or her.

In the following, operation of the seat slide device 10 will be described with reference to the drawings.

For ease of understanding, the description will be commenced with respect to a locked condition of the seat slide device 10.

Under this condition, the pawl 52 of the locking lever 51 of each lock mechanism 55 is in engagement with one of the notches 29a of the lower rail 20. Thus, the upper rails 30 and thus the seat mounted thereon is locked relative to the lower rails 20.

When, for the purpose of changing the seat position, the handle part of the lock releaser 10c is raised by an operator (viz., a seat occupant) against the force of the springs 58, the pawl 52 of the locking lever 51 of each lock mechanism 50 is disengaged from the notch 29a of the lower rail 20 cancelling the locked condition of the seat relative to the fixed lower rail 20.

Thus, when, with the handle part kept raised, the seat is pushed forward or rearward, the same is permitted to move forward or rearward on the lower rails 20. Due to provision of the ball bearings 40, the movement of the upper rails 30 is smoothly carried out.

When the seat is moved to a desired position, the handle part of the lock releaser 10c is released from the operator's hand. With this, the pawl 52 of each lock mechanism 50 is brought into engagement with a newly selected one of the notches 29a of each lower rail 20 by the force of the spring 58. Thus, the seat becomes locked at a new position relative to the lower rails 20.

When, due to a vehicle collision or the like, the seat belt B is applied with an excessive load by a wearer on the seat, the upper rail 30 to which one end of the seat belt B is connected is raised upward separating from the lower rail 20 as is shown by a phantom line in FIG. 1. This upward movement of the upper rail 30 may cancel the locked condition of the lock mechanism 50 mounted to the left slider unit 10b. However, the upward movement of the upper rail 30 does not cause upward movement of the shorter arm portion 55b of one L-shaped bar 55 because of the pivotal connection between the two L-shaped bars 55 and 56. In fact, the upward movement of the upper rail 30 produces only a substantially counterclockwise rotation of the other L-shaped bar 56 about the shorter arm portion 55b of the bar 55 in FIG. 1 without raising the shorter arm portion 55b. Thus, the lock mechanism 50 mounted to the right slider unit 10a is prevented from cancelling the locked condition thereof. Thus, the locked condition of the seat relative to the lower rails 20 is kept safely by the right lock mechanism 50. Thus, the dangerous seat slippage does not occur even upon such vehicle collision 1.

What is claimed is:

1. A seat slide device comprising:
   two slider units which are substantially the same in construction and arranged in parallel with each other, each slider unit including a lower rail adapted to be fixed to a floor member and an upper rail longitudinally slidably disposed on said lower rail and a seat mounted thereon;
   two lock mechanisms respectively mounted to said two slider units for locking the upper rails relative to said lower rails, each lock mechanism including a plurality of notches formed in the lower rail, a locking lever pivotally supported by the upper rail, and a pawl carried by the locking lever and latchingly engageable with said notches; and
   a lock releaser incorporated with both of said two lock mechanisms for cancelling the locked condition of said lock mechanisms when manipulated, comprising:
   two identical bars including first portions connected to each other around a common axis, and second portions secured to said locking levers respectively, and
   means for allowing a relative rotation between said first portions around said common axis.

2. A seat slide device as claimed in claim 1, wherein said means comprising a shaft through which said first portions of said two bars are pivotally connected to each other.

3. A seat slide device comprising:
   two slider units which are substantially the same in construction and arranged in parallel with each other, each slider unit including a lower rail adapted to be fixed to a floor member and an upper rail longitudinally slidably disposed on said lower rail and a seat mounted thereon;
   two lock mechanisms respectively mounted to said two slider units for locking the upper rails relative to said lower rails, each lock mechanism including a plurality of notches formed in said lower rail, a locking lever pivotally supported by the upper rail, and a pawl carried by the locking lever and latchingly engageable with said notches; and
   a lock releaser incorporated with both of said two lock mechanisms for cancelling the locked condition of said lock mechanisms when manipulated, wherein said lock releaser comprises two parts which are pivotally connected at their first portions to each other through a shaft and secured at their second portions to said locking levers of the two lock mechanisms respectively, wherein
   said shaft has axially opposed cylindrical portions rotatably disposed in cylindrical bores respectively formed in said first portions of said two parts.

4. A seat slide device as claimed in claim 3, in which said lower rail includes a channel portion with first and second side walls, and in which said upper rail having a major flat wall portion which faces said channel portion when said upper rail is properly disposed on said lower rail.

5. A seat slide device as claimed in claim 4, in which said lower and upper rails have at their laterally outer sides flange portions which are slidably interlocked with each other.

6. A seat slide device as claimed in claim 5, further comprising a plurality of ball bearings which are operatively disposed between said lower and upper rails for smoothing the movement of said upper rail relative to said lower rail.

7. A seat slide device as claimed in claim 6, in which each of said lower and upper rails is formed with a longitudinally extending guide way for guiding the movement of the ball bearings therealong.

8. A seat slide device as claimed in claim 3, in which each of said lock mechanisms further comprises biasing means for biasing said locking lever in a direction to achieve the latching engagement between said pawl and a selected one of the notches.

9. A seat slide device as claimed in claim 3, in which each of said two parts of said lock releaser is of a generally L-shaped bar, so that, upon assembly, they constitute a generally U-shaped structure.

* * * * *